(12) United States Patent
Waters et al.

(10) Patent No.: US 11,177,959 B2
(45) Date of Patent: *Nov. 16, 2021

(54) CRYPTOGRAPHY METHOD AND SYSTEM FOR SECURING DATA VIA ELECTRONIC TRANSMISSION

(71) Applicants: Thomas J. Waters, St. Petersburg, FL (US); Richard H. Waters, Knoxville, TN (US); Robert N. Barrett, St. Petersburg, FL (US)

(72) Inventors: Thomas J. Waters, St. Petersburg, FL (US); Richard H. Waters, Knoxville, TN (US); Robert N. Barrett, St. Petersburg, FL (US)

(73) Assignees: Thomas J. Waters, St. Petersburg, FL (US); Richard H. Waters, Knoxville, TN (US); Robert N. Barrett, St. Petersburg, FL (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/866,185

(22) Filed: May 4, 2020

(65) Prior Publication Data
US 2020/0266991 A1   Aug. 20, 2020

Related U.S. Application Data

(63) Continuation-in-part of application No. 16/383,985, filed on Apr. 15, 2019, now Pat. No. 10,643,204, which is a continuation-in-part of application No. 15/588,192, filed on May 5, 2017, now Pat. No. 10,263,785.

(60) Provisional application No. 62/332,589, filed on May 6, 2016.

(51) Int. Cl.
| | |
|---|---|
| *H04L 29/06* | (2006.01) |
| *H04L 9/32* | (2006.01) |
| *H04L 9/06* | (2006.01) |
| *H04L 9/08* | (2006.01) |

(52) U.S. Cl.
CPC .......... *H04L 9/3228* (2013.01); *H04L 9/0637* (2013.01); *H04L 9/0825* (2013.01); *H04L 9/0869* (2013.01); *H04L 9/0891* (2013.01); *H04L 2209/38* (2013.01)

(58) Field of Classification Search
CPC ...... G06F 21/10; G06F 21/6218; G06F 21/20; H04L 9/3247; H04L 9/0656; H04L 9/0869
See application file for complete search history.

(56) References Cited

U.S. PATENT DOCUMENTS

| | | | |
|---|---|---|---|
| 1,310,719 | A | 7/1919 | Vernam |
| 8,578,473 | B2 | 11/2013 | Sadler |
| 9,054,871 | B2 | 6/2015 | Horstmeyer et al. |
| 10,263,785 | B1 | 4/2019 | Waters et al. |
| 10,833,858 | B2 * | 11/2020 | Gray .................... G06Q 20/382 |

(Continued)

*Primary Examiner* — Dao Q Ho
(74) *Attorney, Agent, or Firm* — Shumaker, Loop & Kendrick, LLP

(57) ABSTRACT

A blockchain-based record of transactions taking place through a smartphone or other electronic/peripheral device. The blockchain record itself contains mathematical hashes, including encryption if desired, based on the various data components of a smartphone or other device, which creates a distributed ledger system that is extremely difficult to break into to add, delete, or alter individual transactions after the fact.

19 Claims, 15 Drawing Sheets

(56) References Cited

U.S. PATENT DOCUMENTS

2008/0214300 A1   9/2008  Williams et al.
2014/0192981 A1   7/2014  Hiwatari et al.
2019/0244198 A1   8/2019  Waters et al.

* cited by examiner 190  145

3QNPI#HELLO. HOW ARE YOU?BD$TCXZ
10 23 77 94 8 63 1 14 77 12 6 4 9 12 36 15 19 81 11 44 62 18 5 84 90 2 86 51 17 72 40 33

FIG. 6B

CRYPTOGRAPHY METHOD AND SYSTEM FOR SECURING DATA VIA ELECTRONIC TRANSMISSION

TECHNICAL FIELD

The present invention relates to methods and systems for securing data via electronic transaction, and more particularly, for securing data in transit or stored data while providing a degree of anonymity to the communicants using multiple layers of encryption and Discreet Key Exchange methodology. The invention further relates to a method for using QR Codes to provide a software-based method for securing information without the need for specialized hardware, which can be further incorporated into smart packaging, anti-counterfeiting measures, fraud prevention, and e-commerce transactions. The invention further relates to a system and method for creating a secure blockchain through mobile devices including smartphones, tablets, medical devices, automobiles, delivery vehicles, and more by the use of Transactional Cryptography ("TC"), by means of multiple layers of encryption and a Discreet Key Exchange methodology to safely deliver the highest level of security available.

BACKGROUND OF THE INVENTION

Electronic data is typically secured using 'open' encryption. The current 'open' encryption standard is Public Key infrastructure (PKI), which is built around two critical components:

1. Key-Pairs

A key-pair set is a pair of keys (an encryption key and a decryption key) that are mathematically bound to each other. Key-pair sets are most easily understood by comparing them to the electronic equivalent of a physical lock and key. The "Encryption Key" is like the lock—it is what makes the encrypted information secure from viewing by unauthorized parties. The "Decryption Key" is like a physical key, it allows you to open the lock and retrieve what is inside the package.

2. Public Storage of One Key

The "Encryption Key" (the digital 'lock') is stored in a public place, where anyone can pick it up and use it. This makes it easily available to all—akin to taking a physical lock off a shelf to secure an outside door. But in the digital realm, this availability/openness exposes and potentially renders vulnerable part of the security that is critical for secure communication between parties.

In an overly simplified example of this in action, a user places information (email, c-commerce transaction, medical data transfer, wearables device data, etc.) into a box and secures it by retrieving the lock ("Encryption Key") from a publicly available repository. Then he sends the locked box to the end user who uses his key ("Decryption Key") to unlock the box and retrieve the information.

In reality, this process is far more complicated, but can be explained with the following algebraic equation:
Consider (AB) as the first user's key-pair: "A" is the lock and "B" is the key.
Consider (YZ) as the second user's key-pair: "Y" is the lock and "Z" is the key.
Both users have published their locks (A & Y) to a public repository so others can communicate with them securely.

The following are all true:

$$A \neq B \neq Y \neq Z \quad \frac{AB}{YZ} \neq 1 \quad \frac{BY}{AZ} = 1$$

Then mathematically the following is also true:

$$\frac{BY}{AZ}(\text{Data}) = (\text{Data})$$

The above equation shows the computation of the package (Data), illustrating its transition from one user to another.

The steps would occur this way:
1. Combine the first user's private key (B) and the second user's publicly available "lock" (Y) with the information to be sent (Data). This creates a locked package that is sent to the end user.

BY(Data)

2. The end user takes the received package and applies its own private key (Z) and the first user's public key (A) retrieved from the repository.

$$\frac{BY(\text{Data})}{AZ}$$

3. After applying the missing pieces (AZ) to the received package (BY(Data)) then the original data is revealed.

The "Public Key" allows anyone to lock data in a way that only the recipient will be able to unlock. This feature is both a strength and weakness. It allows the locking piece to be used by anyone that wants to communicate securely. However, because it is publicly available, it also makes reverse engineering of the algorithm time consuming, but not impossible. If, one wants to derive another's private key, he can simply reverse engineer it with enough time and processor power. Given both, one may eventually extract (Z) from (BY(DATA))/A, since the public key ("A") and data package (BY(Data)) are online for an infinite period of time. The solution to the above problems is to never share or publicly post a key-pair, or to have the key-pair changed for each and every transaction that is encrypted.

QR (Quick Response) Codes were invented by Toyota Automotive Company's parts division, the Denso Corporation, to solve the problems of limited information that can be transmitted on conventional (aka, 'zebra striped') generic bar codes. Barcodes are machine-readable optical labels that provide information about the item to which they are attached. The QR code expanded beyond the automotive industry and soon grew into other purposes, including rewards programs and digital coupons.

Current uses for QR codes include supply chain, inventory management, and shipping information. In Asia they are frequently used for payment information without the need for Western credit card platforms. Services including Alipay and WeChat Pay utilize QR codes to facilitate transactions at fast food restaurants, convenience stores, and popular retailers.

Unlike Western payment systems, QR Code readers are relatively inexpensive, putting them within easy reach of vegetable sellers and foot cart vendors in rural areas and developing countries. Rather than using credit card based platforms these readers can read QR codes from consumer smartphones efficiently and inexpensively.

Already widespread in China, QR codes are increasingly common in Japan, Korea, and spreading quickly to other parts of Asia. While acceptance in the U.S. and Europe has been slow, the technology is quickly morphing as more and more transactions are taking place (1) digitally, and (2) via mobile devices, particularly smartphones.

In markets such as Singapore and Hong Kong, consumers still typically use credit cards for transactions at restaurants or shops. While contactless chip-based technology upgrades have made credit card use faster, they still take longer than QR code transactions. The time savings add up quickly when there are many consumers trying to use transactional system at the same time, as is commonly seen at train stations, bus depots, concert halls, and athletic stadiums, among other places.

QR codes have grown so popular in China, transactions surpassed $5.8 trillion in the first quarter of 2018—they are so ubiquitous, beggars often use QR codes because few people carry cash anymore.

As an internal tracking mechanism, QR codes are an ideal solution. However, problems exist with the use of QR codes on a grand scale. In particular, when QR codes are used on a grand scale outside the bounds of the "internal controls" of a strictly internal system, data within the QR code may be easily compromised. For example, QR Codes are being used across the internet for many sensitive transactions (including financial and privacy related), which renders the data within these QR codes susceptible to potential misuse/abuse and/or wherein information within these QR codes may be easily compromised and/or intercepted by third parties. Therefore, what is needed is a method to secure and safeguard these communications (e.g., data with QR codes) at the transactional level.

BRIEF SUMMARY

Therefore, it is an objective of the present invention to provide methods and systems that avoid and/or reduce the risk of the above mentioned problems and to provide further solutions directed to enhancing security of QR codes especially when used on a grand scale and/or during sensitive transactions. It should be noted that in contrast to the above discussed PKI, Transactional Cryptography ("TC") disclosed herein uses multiple layers of encryption and a Discreet Key Exchange methodology to safely deliver the highest level of communications security available. TC uses asymmetrical key-pair sets to create unique, one-time keys for the encryption process. However, the "Encryption Key" (e.g. the "lock" part) is not stored publicly. Instead of a long-lived, single key-pair set, TC generates a single-use set of key-pairs (a lock and key combination) for the communication transaction to use one time, and one time only, and then discard. Key distribution is handled through a method called Discreet Key Exchange ("DKE"). DKE methodology holds each asymmetrical key separately and yet intrinsically linked together.

Transactional Cryptography disclosed herein utilizes Vernam's ideals (disclosed in U.S. Pat. No. 1,310,719), with the added complexity of (new) asymmetrical keys, and combines it with a (new) secure discreet key exchange process.

When a user ("Originator") wants to send data to another user ("Receiver"), a request to a trusted, third-party ("Repository"—a liaison that is a service that acts as a go-between and/or liaises between the two end points and/or two users) is made. The Repository creates a Transactional Identifier and generates two new key-pairs. As shown in FIG. 1, Repository sends the Transactional Identifier and the encryption key (lock "A") to the Originator. This concept may be further adapted for use with QR codes. For example, inclusion of TC with QR Codes will enable for a secure communications channel to be created prior to the exchange of any personally sensitive information. When a user (Originator) scans a QR Code, the embedded link will make a Request to a trusted, third-party ("Repository"). The Repository creates a Transactional identifier and generates two new key-pairs. Again as shown in FIG. 1, Repository sends the Transactional Identifier and the encryption key (lock "A") to the Originator.

Then the Repository sends the Transactional Identifier and the decryption key (key "Z") to the Receiver as shown in FIG. 2.

The Originator uses the encryption key (lock "A") to encrypt the data, and then adds the encrypted data with the Transactional Identifier together to form a package and sends it to the Repository. The Repository recognizes the Transactional Identifier then adds both the Transactional Identifier and the Originator's decryption key (key "B") to the encrypted data then encrypts this new package with the Receiver's encryption key (lock "Y") and sends it to the Receiver.

The Receiver recognizes the Transactional Identifier and uses the associated decryption key (key "Z") to open the package. The Receiver verifies the Transactional Identifier inside the encrypted package matches with the one from the outside of the encrypted package, then decrypts the data inside the package with Originator's decryption key (key "B"). Receiver now has the data from the Originator.

Further authentication of data integrity is performed each time the package is handed to the next party by generating a hash of the data provided and comparing the generated hash with a hash value sent by the previous party.

In this methodology, the "Repository" is a trusted third-party to the communication—this can be a physical third-party (e.g. VeriSign, PayPal, DocuSign, etc.) or a service running on one of the user's domains (e.g. an Active Directory service). Implementation of TC can be used in numerous environments and in many different embodiments including both software and hardware. The two strongest points to one-time use encryption keys are that:

(1) The encrypted message never falls into a repetitive (predictable) pattern, and
(2) The encrypted message will have a uniform frequency distribution (of characters).

In certain aspects, the key pairs disclosed herein can be generated by an independent system(s)/hardware and communicated via the repository to the Originator and/or Recipient.

Because every letter in a message encrypted in this manner is equally likely to occur, there is no mathematical way to determine a letter's prevalence. A single letter can be a single replacement letter, or it could be any assigned number running well into the multiple trillions. The message itself doesn't care, and a computer with the corresponding key can easily decrypt it at the other end.

The random pairing of each character in the message further strengthens the encryption because no letter ever re-uses a previously used pairing. Encrypting the word 'wood' results in different key pairs for each use of the letter 'o'. Looking at the encrypted word, an intercepting agent would not know the decrypted word contains two identical letters beside each other because their key-pairs are different.

Furthermore, the spaces between individual words are similarly paired in a one-time-key manner each and every time they occur. This prevents an intercepting agent from determining the length of each individual word and how many times that word occurs in the message. Such information helps so-called 'brute-force' decryption by identifying qualifiers and set up words in intercepted communications.

An additional security measure will add random strings of extraneous characters to a message—the beginning, middle, or end—to mask the size and purpose of the message. The encryption algorithm can be designed to recognize these strings of characters are purely for 'padding' purposes to mask the true content and length of the encrypted file, ignoring them completely when the message is properly decrypted.

The encryption algorithm can be further secured by being set to automatically delete itself upon being properly decrypted. Like SnapChat and similar social media, the encryption can self-destruct, leaving the decrypted message in its original state while leaving no digital forensics for an intercepting agent to try and reconstruct.

Thus, based on the above description, disclosed is a method and system for securing various data packages through an electronic transaction. This technology employs various methods of securing the data in transit and may provide anonymity to the data for end use consumption and archiving. A user may pass data securely to a recipient by way of a trusted third party acting as a security provider. This security provider supplies a method of discreet key exchange and creates a separation between the two communicants that introduces a level of anonymity for both parties. When the user desires to transmit data securely, the user will provide the data and the recipient's contact information to the security provider by way of a specific software program/service/hardware provided by the security provider (herein simply called the "widget"). The widget will request a transaction record be created along with two, single-use key-pairs that will are linked together for this specific communication. The security provider sends part of each key-pair to either end of the communication along with a transaction identifier. The widget at each end of the communication will use its key to either encrypt or decrypt the originator's data (respectively). This method provides an in depth method of protection through multiple layers of encryption powered by unique, single-use keys.

Specifically disclosed is a method for encrypting data utilizing a data encryption server, including the steps of: registering, with the server, a data originator; creating, by the server, a data originator encryption key and a corresponding recipient encryption key, the data originator encryption key and the recipient encryption key being a randomly-generated asymmetrical key-pair set configured for one-time use and not otherwise publicly stored; transmitting, by the server, the data originator encryption key to a data originator peripheral device and the recipient encryption key to a recipient peripheral device; encrypting data to be transmitted by the data originator peripheral device with the data originator encryption key; transmitting the encrypted data to the recipient peripheral device; verifying that the recipient encryption key and the data originator encryption key are from the same randomly-generated key-pair set; and if the recipient encryption key and the data originator encryption key are verified to be from the same randomly-generated key-pair set, decrypting the encrypted data received by the recipient peripheral device.

In certain aspects, wherein the randomly-generated key-pair set is utilized for a single data transmission between the data originator peripheral device and the recipient peripheral device and discarded after (e.g., immediately after) decryption of the transmitted data.

In certain aspects, the data to be transmitted is a message, global positioning systems (GPS) data, and/or financial data, and each character and/or space of the message, global positioning systems (GPS) data, and/or financial data is assigned a randomly-generated character. The randomly-generated character may be a number or symbol. In preferred aspects, the randomly generated character is a number.

In certain aspects, the randomly-generated character is not repeated.

In further aspects, additional randomly-generated intermittently randomly dispersed characters that do not correspond to the data to be transmitted are further provided to further mask/conceal the nature and size of the data to transmitted to the recipient peripheral device.

In certain aspects, the additional randomly-generated intermittently randomly dispersed characters are not repeated. The additional randomly-generated intermittently randomly dispersed character may be a number or symbol. In preferred aspects, the randomly-generated intermittently randomly dispersed character is a number.

In certain aspects, the encrypted data has a unique file extension. The unique file extension includes at least one of an .epub file, a .zip file, or a .tkp file.

In certain aspects, the method further includes tracking the encrypted data via blockchain technology.

Also disclosed herein are systems for implementing the disclosed methods. Specifically disclosed is a system for encrypting data including at least a first and second peripheral device; a data encryption server; and a network router; wherein the first peripheral device is a data originator and is configured to register with the encryption server; the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored; the encryption server is further configured to transmit the data originator encryption key to the first peripheral device and the recipient encryption key to the second peripheral device, which is a recipient peripheral device; the encryption server is configured to encrypt data to be transmitted by the data originator peripheral device with the data originator encryption key and transmit the encrypted data to the recipient peripheral device; at least one of the first peripheral device, the second peripheral device, and/or encryption server are configured to verify that the recipient encryption key and the data originator encryption key are from the same randomly-generated key-pair set; and if the recipient encryption key and the data originator encryption key are verified to be from the same randomly-generated key-pair set, decrypting the encrypted data received by the recipient peripheral device.

In other aspects, the data to be transmitted with the system is a message, global positioning systems (GPS) data, and/or financial data, and certain ones of characters and/or spaced of the message global positioning systems (GPS) data, and/or financial data are assigned a randomly-generated character. The randomly-generated character may be a number or symbol. In preferred aspects, the randomly generated character is a number.

In certain aspects, the randomly-generated character is not repeated.

In further aspects, additional randomly-generated intermittently randomly dispersed characters that do not correspond to the data to be transmitted are further provided to further mask/conceal the nature and size of the data to transmitted to the recipient peripheral device.

In certain aspects, the additional randomly-generated intermittently randomly dispersed characters are not repeated. The additional randomly-generated intermittently randomly dispersed character may be a number or symbol. In preferred aspects, the randomly-generated intermittently randomly dispersed character is a number.

In certain aspects, the encrypted data has a unique file extension. The unique file extension includes at least one of an .epub file, a .zip file, or a .tkp file.

In certain aspects, the method further includes tracking the encrypted data via blockchain technology.

Embodiments of the invention can include one or more or any combination of the above features and configurations.

In certain aspect disclosed is a method for encrypting data within a QR code utilizing a data encryption server, including the steps of: registering, with the server, a data originator; creating, by the server, a data originator encryption key and a corresponding recipient encryption key, the data originator encryption key and the recipient encryption key being a randomly-generated asymmetrical key-pair set configured for one-time use and not otherwise publicly stored; transmitting, by the server, the data originator encryption key to a data originator peripheral device and the recipient encryption key to a recipient peripheral device; encrypting data within the QR code to be transmitted by the data originator peripheral device with the data originator encryption key; transmitting the encrypted data within the QR code to the recipient peripheral device; verifying that the recipient encryption key and the data originator encryption key are from the same randomly-generated key-pair set; and if/when the recipient encryption key and the data originator encryption key are verified to be from the same randomly-generated key-pair set, decrypting the encrypted data within the QR code received by the recipient peripheral device such that information within the QR code is accessible and may be viewed/read.

Also disclosed is a system for encrypting data within a QR code, including (a) at least a first and second peripheral device; (b) a data encryption server; (c) and a network router allowing for communication of an encrypted QR code between the first peripheral device, second peripheral device, and data encryption server; wherein: the first peripheral device is a data originator and is configured to communicate with and register with the encryption server; the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored; the encryption server is further configured to transmit the data originator encryption key to the first peripheral device and the recipient encryption key to the second peripheral device, which is a recipient peripheral device; the encryption server is configured to encrypt data within the QR code that is to be transmitted by the data originator peripheral device with the data originator encryption key and transmit the encrypted data within the QR code to the recipient peripheral device; at least one of the first peripheral device, the second peripheral device, and/or encryption server are configured to verify that the recipient encryption key and the data originator encryption key are from the same randomly-generated key-pair set; and if the recipient encryption key and the data originator encryption key are verified to be from the same randomly-generated key-pair set, decrypting the encrypted data within the QR code received by the recipient peripheral device such that information within the QR code is accessible and may be viewed/read.

Blockchain is an open and distributed ledger system of recording transactions between parties in efficient and verifiable ways, is poised to disrupt many types of digital and physical merchandise tracking. Blockchain's foundational design means transactions are protected from tampering, deletion, and revision by unscrupulous characters. Because the ledger is usually (but not necessarily) distributed (i.e.: recreated) among multiple parties, it remains permanently secure and does not require a single, overarching entity to regulate it.

Popularized by the bitcoin paper authored by Satoshi Nakamoto "Bitcoin: A Peer-to-Peer Electronic Cash System", published in 2009. https://bitcoin.org/bitcoin.pdf, blockchain has several founding principles. These include but are not limited to:

1. A Distributed Structure: All participants have equal access to the database of information. There is no central authority like a bank or government agency.
2. Peer-to-Peer: Communication, or more correctly, transmission of a transaction, occurs directly between two parties without going through a central actor like a bank or government agency. Each party in the transaction is called a node.
3. Transparency and Psuedonymity: Every transaction is visible to all parties within a particular blockchain system. Each user, or node, can choose to remain anonymous or provide proof of identity under particular control limits. How much information each party chooses to reveal is entirely up to them as agreed upon by all of the participants.
4. Irreversibility of Records: Once a transaction is entered into the blockchain database it cannot be altered or deleted. Every action is permanent and simply added to the growing chain of data. Blocks of data—hence the term 'blockchain'—are added in chronologic order, permanently discernible by all members.
5. Computational Logic Design: The transactions themselves can be tied to any number of logic and algorithmic metrics, both from a data and security perspective, depending on the type of ledger needed. This mathematic structure can also include transactions that can be triggered automatically under certain conditions.

Like a complex e-mail chain that delivers specific value as much as it does information, blockchain will likely bring us smart contracts that can execute automatically based on certain conditions and criteria. Unlike paper contracts locked away in a cabinet, these can be living documents that are added to over time, amended as needed, and linked to the originating document at the beginning of the chain.

Blockchain technology is disrupting a number of legacy systems, with many more to follow. For digital products, Digital Rights Management, or DRM, has been a slow, uncertain, and inconvenient means for addressing the security of digital products such as movies, music, and electronic books (ebooks). The currently used technology is not consumer friendly and provides little assurance to copyright holders that their work is secure.

Mobile payments systems are another area poised for disruption by blockchain technologies, particularly in smartphones. Right now, Apple Pay and similar services are using NFC-chips for secure transactions in vending machines and mass transit. But these require specialty hardware to retrofit existing infrastructure, meaning high capital and maintenance costs.

Digital photography and video is another area where blockchain can protect legitimate copyright holders from the unauthorized use of their work via mobile devices. From social media apps to websites to messaging services, being able to secure and audit the movement of photos and digital clips remain elusive.

The same will take place with videogames, esports, and augmented or virtual reality technology, as the programming and operational costs of these services continues to rise. Companies like Machine Zone Inc. and King Digital Entertainment know that around 5% of paying players pick up the cost for the millions of freemium players not paying anything. Keeping these paying players engaged, and ensuring their information is secure, is difficult, and has already become the subject of economic espionage cases prosecuted by the FBI and other federal agencies.

Medical devices are another type of mobile device that blockchain could make considerable strides in. Because these instruments must be (a) individually addressable, (b) contain a lot of very personal information about patients, and often (c) receive electronic instructions from physicians and other medical staff that must be audited, they are ripe for disruption by blockchain technologies.

Digital gift cards and couponing are another area susceptible to disruption by blockchain. Adding additional value to retailers, they will immediately be able to determine the Return on Investment (ROI) from sponsorships, hosted events, and other opportunities where it is difficult to determine if and how a campaign was successful. Blockchain, particularly through mobile devices like smartphones, provide an opportunity to put a time stamp on those returns—how successful were they? They also can put a GPS location on them, so retailers will know when and where consumers have chosen to redeem their digital purchases.

Mobile devices can also reflect mobility—automobiles are becoming communications hubs, with the average passenger car now containing dozens of computer chips. When autonomous cars become mainstream in a few years they will be even more reliant on microprocessor technology. We've already seen how cars can be hacked (see "Hackers Remotely Kill a Jeep on the Highway—With Me In It", Wired, Jul. 21, 2015 https://www.wired.com/2015/07/hackers-remotely-kill-jeep-highway/), so technologies like blockchain that can secure mobile devices that also have wheels will be particularly valuable. Blockchain could secure any number of areas in a vehicle—payments systems (tolls, parking), to smart grids (traffic, accident data), to autonomous driving (lane and speed maintenance), entertainment (streaming movies and music), and commercial services (corporate networks and fleet services), among others.

Supply chain systems are another area the disclosed invention could radically change, and we feature one such application in the drawings. This allows smartphones to be the intermediaries for supply chain services across companies, industries, and even personal vs company supplied devices. All of these will operate in a secure manner that keeps prying eyes out of personal and corporate data areas they are not authorized to view.

What all of these examples share in common is the authenticity of a mobile device. The disclosures herein seek to leverage mobile devices by mathematically authenticating their accesses based on alphanumeric information each device possesses that make them individually unique. With future deliveries being made by autonomous drone devices, (on the ground and in the air), the utility of such functionality is obvious Secure communications between drone vehicles, between vehicles and central control, for inventory management and supply chain-of-custody, are but three obvious uses.

In view of the above disclosed blockchain/blockchain communications embodiments. Also disclosed is a method for encrypting data within a blockchain and/or blockchain communications utilizing a data encryption server, comprising the steps of: registering, with the server, a data originator; creating, by the server, a data originator encryption key and a corresponding recipient encryption key, the data originator encryption key and the recipient encryption key being a randomly-generated asymmetrical key-pair set configured for one-time use and not otherwise publicly stored; transmitting, by the server, the data originator encryption key to a data originator peripheral device and the recipient encryption key to a recipient peripheral device; encrypting data within a first block and/or transaction to be transmitted by the data originator peripheral device with the data originator encryption key to a recipient peripheral device; transmitting the encrypted data within the first block and/or transaction to the recipient peripheral device; verifying that the recipient encryption key and the data originator encryption key are from the same randomly-generated key-pair set; and when/if the recipient encryption key and the data originator encryption key are verified to be from the same randomly-generated key-pair set, decrypting the encrypted data within the first block and/or transaction received by the recipient peripheral device such that information within the first block and/or transaction is accessible and may be viewed/read. In certain aspects the method further includes registering, with the server, a second data originator that is the recipient of the first block and/or transaction from the first data originator; creating, by the server, the second data originator encryption key and a corresponding second recipient encryption key, the second data originator encryption key and the second recipient encryption key being a randomly-generated asymmetrical key-pair set configured for one-time use and not otherwise publicly stored; transmitting, by the server, the second data originator encryption key to the second data originator peripheral device and the second recipient encryption key to a second recipient peripheral device; encrypting data within a second block and/or transaction to be transmitted by the second data originator peripheral device with the second data originator encryption key to the second recipient peripheral device; transmitting the encrypted data within the second block and/or transaction to the second recipient peripheral device; verifying that the second recipient encryption key and the second data originator encryption key are from the same randomly-generated key-pair set; and when the second recipient encryption key and the second data originator encryption key are verified to be from the same randomly-generated key-pair set, decrypting the encrypted data within the second block and/or transaction received by the second recipient peripheral device such that information within the first block and/or transaction is accessible and may be viewed/read.

In view of the above disclosed blockchain/blockchain communications embodiments. Also disclosed is a system for encrypting data within blockchain communications, comprising (a) at least a first and second peripheral device; (b) a data encryption server; and (c) a network router allowing for communication of an encrypted a first block and/or transaction between the first peripheral device, second peripheral device, and data encryption server; wherein: the first peripheral device is a data originator and is configured to communicate with and register with the encryption server; the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored; the encryption server is further configured to transmit the data originator encryption key to the first peripheral device and the recipient encryption key to the second peripheral device, which is a recipient peripheral device; the encryption server is configured to encrypt data within the first block and/or transaction that is to be transmitted by the data originator peripheral device with the data originator encryption key and transmit the encrypted data within the a first block and/or transaction to the recipient peripheral device; at least one of the first peripheral device, the second peripheral device, and/or encryption server are configured to verify that the recipient encryption key and the data originator encryption key are from the same randomly-generated key-pair set; and if the recipient encryption key and the data originator encryption key are verified to be from the same randomly-generated key-pair set, decrypting the encrypted data within the a first block and/or transaction received by the recipient peripheral device such that information within the a first block and/or transaction is accessible and may be viewed/read. Also, in certain aspects, the system further includes: (c) a third peripheral device, wherein the second peripheral device is a second data originator and is configured to communicate with and register with the encryption server; the encryption server is configured to concurrently create a second data originator encryption key and a corresponding second recipient encryption key once the second peripheral device registers with the encryption server, the second data originator encryption key and the second recipient encryption key being a randomly-generated asymmetrical key-pair set configured for one-time use and not otherwise publicly stored; the encryption server is further configured to transmit the second data originator encryption key to the second peripheral device and the second recipient encryption key to the third peripheral device, which is a second recipient peripheral device; the encryption server is configured to encrypt data within a second block and/or transaction that is to be transmitted by the second data originator peripheral device with the second data originator encryption key and transmit the encrypted data within the second block and/or transaction to the second recipient peripheral device; at least one of the second peripheral device, the third peripheral device, and/or encryption server are configured to verify that the second recipient encryption key and the data originator encryption key are from the same randomly-generated key-pair set; and if the second recipient encryption key and the second data originator encryption key are verified to be from the same randomly-generated key-pair set, decrypting the encrypted data within the second block and/or transaction received by the second recipient peripheral device such that information within the a second block and/or transaction is accessible and may be viewed/read.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 6A depicts the decryption methods disclosed herein in which randomly-generated character, which are not repeated, correspond to the data desired to be sent to the recipient;

FIG. 6B further depicts randomly-generated intermittently randomly dispersed characters that do not correspond to the data to be transmitted are further provided to further mask/conceal the nature and size of the data to transmitted to the recipient peripheral device;

DETAILED DESCRIPTION

Figure 1:
FIG. 1 depicts the Transactional Identifier and the encryption key (lock "A") sent from the Repository to the Originator.
Figure 2:
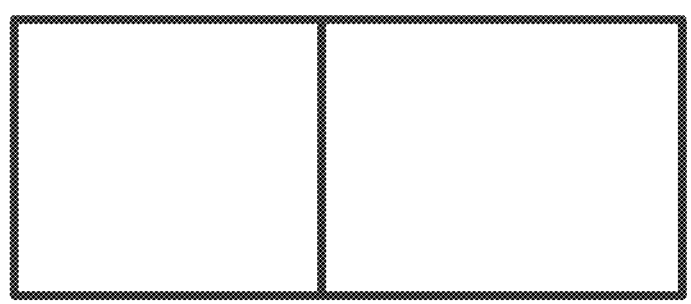
FIG. 2 depicts the Transactional Identifier and the decryption key (key "Z") sent from the Repository to the Receiver.

The present invention will now be described more fully hereinafter with reference to the accompanying drawings in which exemplary embodiments of the invention are shown.

However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. It will be understood that like or analogous elements and/or components, referred to herein, may be identified throughout the drawings with like reference characters. It will be further understood that several of the figures are merely schematic representations of the present technology. As such some of the components may have been distorted from their actual scale for pictorial clarity.

As defined herein, an "Originator" (e.g., a first peripheral device and/or an originator's peripheral device) may be any entity who attempts to send data (e.g., an encrypted QR code) electronically.

A "Receiver" (e.g., a second peripheral device and/or a recipient's peripheral device) may be the end-point of electronic transaction that receives the data electronically.

A "security provider" may be an entity, device, or service that provides the defined services disclosed herein.

A "key-pair" is a set of encryption keys that are intrinsically tied together but function separately and are generally referred to as the encryption key and the decryption key.

The present invention is described below with reference to block diagrams and operational illustrations of methods, systems, and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently. The invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Generally, in terms of hardware architecture for the electronic devices disclosed below, computing device includes a processor, a memory, and one or more input and/or output (I/O) devices (or peripherals) that are communicatively coupled via a local interface. Local interface may be one or more buses or other wired or wireless connections, as is known in the art. Local interface may have additional elements, which are omitted for simplicity, such as controllers, buffers (caches), drivers, transmitters, and receivers to facilitate external communications with other like or dissimilar computing devices. Further, local interface may include address, control, and/or data connections to enable internal communications among the other computer components.

The processor is a hardware device for executing software, particularly software stored in memory. The processor can be any custom made or commercially available processor, such as, for example, a Core series or vPro processor made by Intel Corporation, or a Phenom, Athlon or Sempron processor made by Advanced Micro Devices, Inc. In the case where computing device is a server, the processor may be, for example, a Xeon or Itanium processor from Intel, or an Opteron-series processor from Advanced Micro Devices, Inc. Processor may also represent multiple parallel or distributed processors working in unison. Processor may also represent multiple processors located in a plurality of computing devices working in parallel, unison, or serial effort to achieve the disclosed methods.

Memory can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic magnetic, optical, and/or other types of storage media. Memory can have a distributed architecture where various components are situated remote from one another, but are still accessed by processor. These other components may reside on devices located elsewhere on a network or in a cloud arrangement.

The software in memory may include one or more separate programs. The separate programs comprise ordered listings of executable instructions for implementing logical functions. The software in memory may include the system in accordance with the invention, and a suitable operating system (O/S). Examples of suitable commercially available operating systems are Windows operating systems available from Microsoft Corporation, Mac OS X available from Apple Computer, Inc., a Unix operating system from AT&T, or a Unix-derivative such as BSD or Linux. The operating system O/S will depend on the type of computing device. For example, if the computing device is a PDA or handheld computer (e.g., smartphone), the operating system may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system essentially controls the execution of other computer programs, such as the system, and provides scheduling, input-output control, file and data management, memory management, and communication control and related services.

If computing device is a PC compatible computer, Apple® computer, a handheld device, or the like, the software in memory may further include a basic input output system (BIOS). The BIOS is a set of essential software routines that initialize and test hardware at startup, start operating system, and support the transfer of data among the hardware devices. The BIOS is stored in ROM so that the BIOS can be executed when computing device is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, Swift, and Lua.

I/O device may include input devices such as a keyboard, a mouse, a scanner, a microphone, a touch screen, a bar code reader, or an infra-red reader. It may also include output devices such as a printer, a video display, an audio speaker or headphone port or a projector. I/O device may also comprise devices that communicate with inputs or outputs, such as a short-range transceiver (RFID, Bluetooth, etc.), a telephonic interface, a cellular communication port, a router, or other types of network communication equipment. I/O device may be internal to computing device, or may be external and connected wirelessly or via connection cable, such as through a universal serial bus port. In certain aspects, hardware-based encryption devices may be used with the systems and methods disclosed herein, which include capacitive touch screen devices, Apple Pencil, authenticated signature or voice, tablet, phone, PDA, IoT, wearable tech, ICS/SCADA, and medical devices.

When the computing device is in operation, processor is configured to execute software stored within memory, to communicate data to and from memory, and to generally control operations of computing device pursuant to the software. The system and operating system, in whole or in part, may be read by processor, buffered within processor, and then executed.

In the context of this document, a "computer-readable medium" may be any means that can store, communicate, propagate, or transport data objects for use by or in connection with the system. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system can be embodied in any type of computer-readable medium for use by or in connection with an instruction execution system or apparatus, such as a computer.

For purposes of connecting to other computing devices, computing device is equipped with network communication equipment and circuitry. In a preferred embodiment, the network communication equipment includes a network card such as an Ethernet card, or a wireless connection card. In a preferred network environment, each of the plurality of computing devices on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks. In certain aspects, standalone systems not requiring connectivity to other systems are also contemplated.

According to various embodiments, the disclosed systems and methods may employ various information technology devices and/or services (networks, computers, servers, networking devices, private and public clod services etc.) that may: (1) authenticate the Originator's account, (2) authenticate the Recipient's account, (3) generate single-use encryption key-pairs, (4) encrypt and/or decrypt data, (5) transmit and receive data packets, (6) store transactional data to ensure proper recordkeeping for integrity and non-repudiation, and (7) employ various verification devices (CRC, file hashing, etc.) to ensure data integrity through the transaction.

Figure 3:
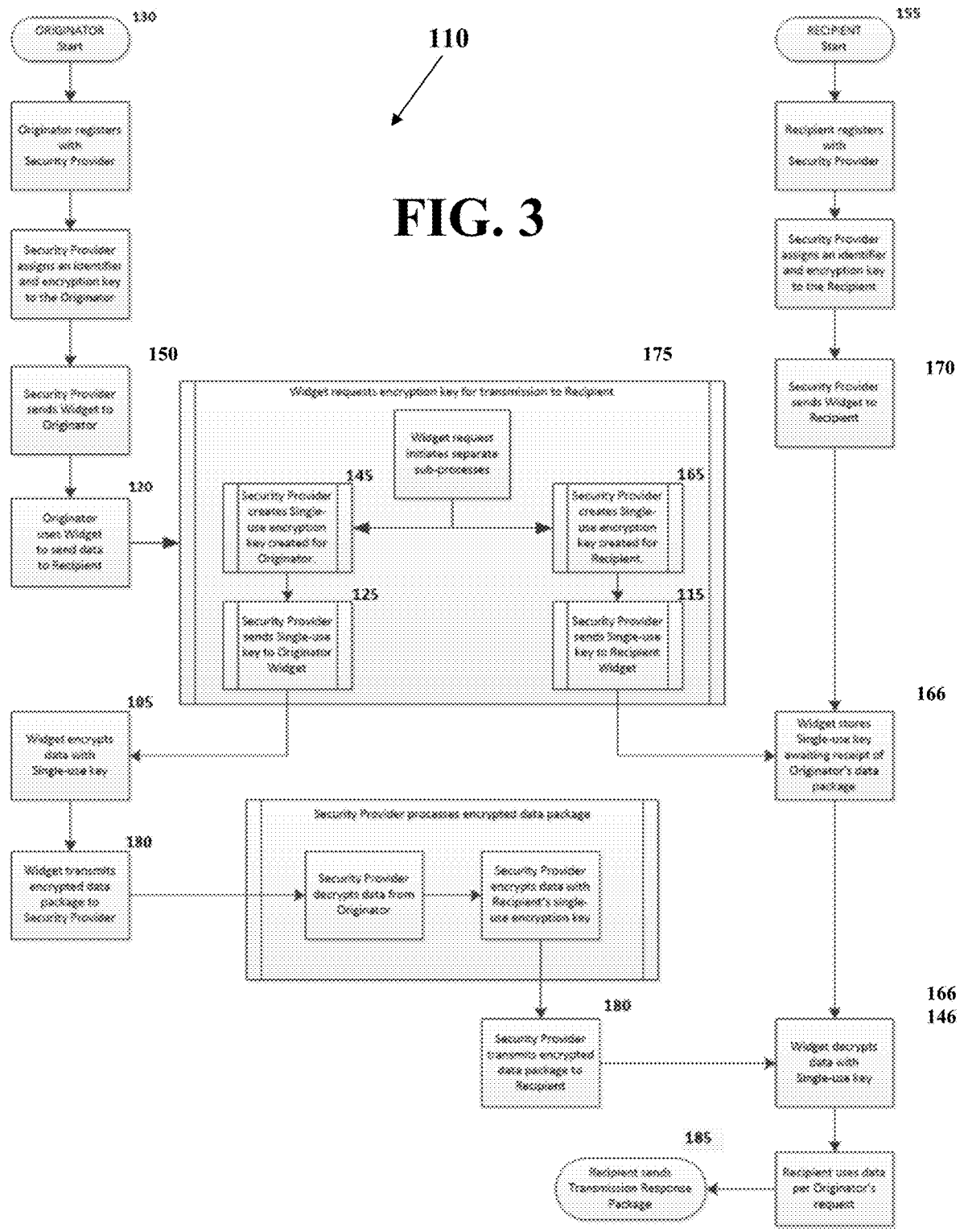
FIG. 3 depicts a general data flow chart of the disclosed systems and methods.
Figure 4:
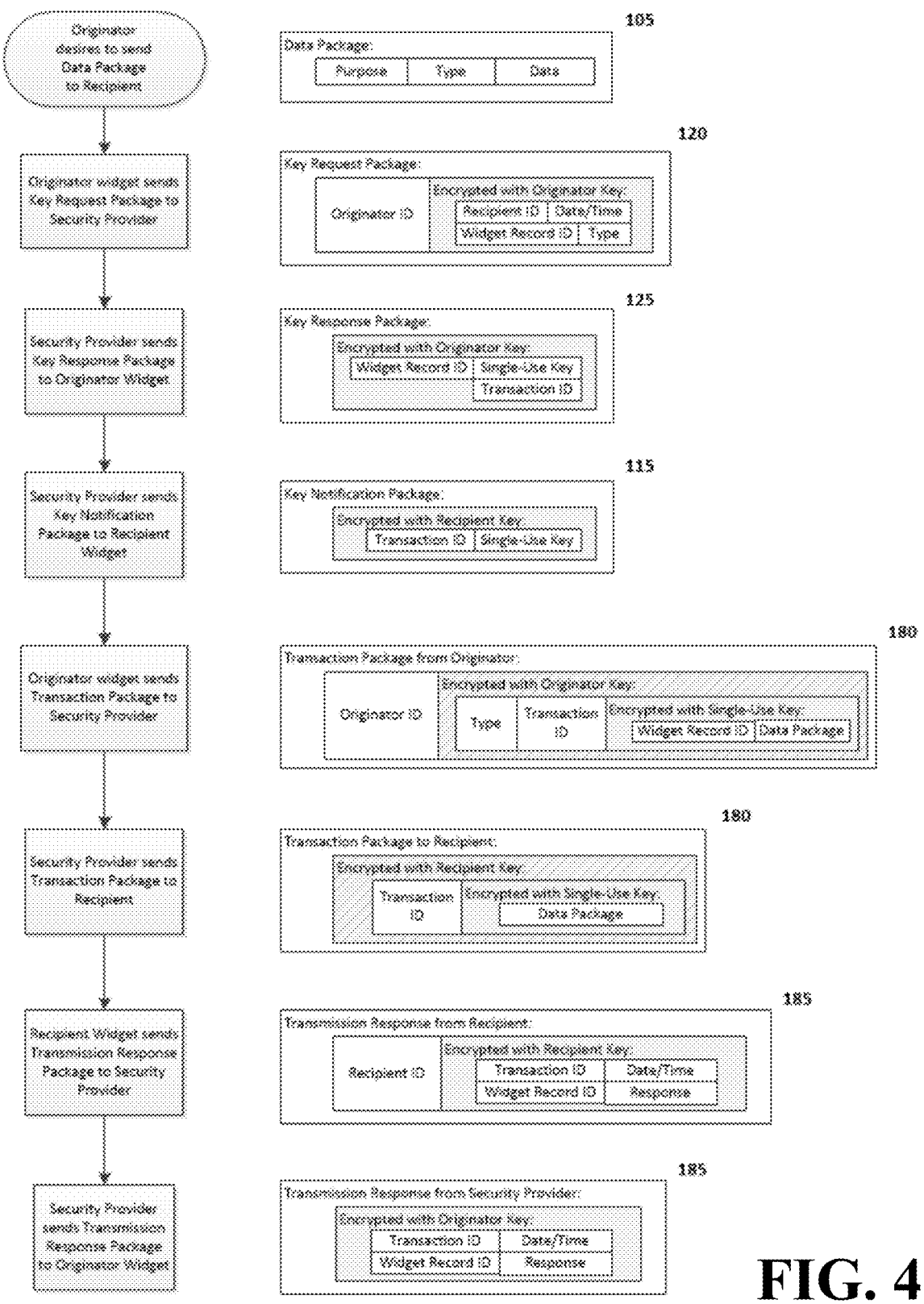
FIG. 4 depicts an exemplary process flow further disclosing encryption and data encapsulation that occurring temporally during the disclosed method(s).

The disclosed systems and methods will now be further described in view of FIGS. 3 and 4. Specifically, FIGS. 3 and 4 are schematic diagrams depicting general process flows of the disclosed methods and systems.

Figure 9:
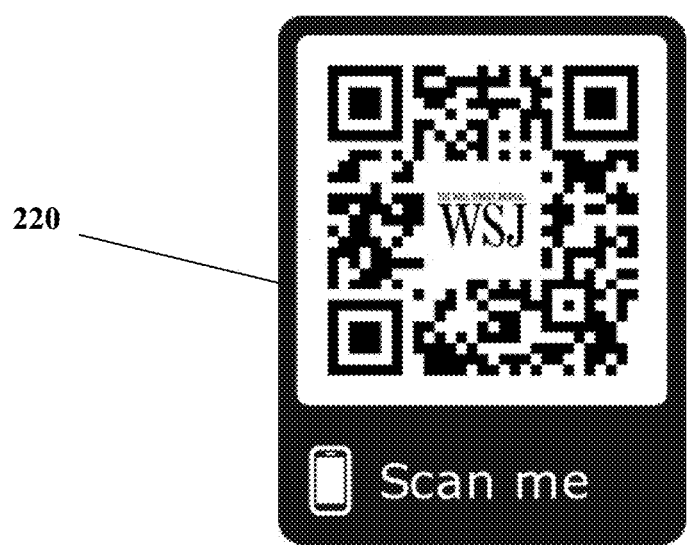
FIG. 9 is a QR code (encrypted QR code) featuring a brand logo, as well as an instructional frame around the code to direct consumers as to specific actions to take.

The originator 130 may desire to send data 100 (e.g., a QR code 200, 210 and/or an encrypted QR code 220 as shown in FIG. 9) from originator's device to a recipient 155 (i.e., recipient's device). Originator 130 registers with the security provider 175 and receives a widget 150 to process data transmissions securely (e.g., to decrypt encrypted QR code(s)). (The widget is preferably a stand-alone portable application installed and executed on web pages, to offer site visitors enhanced functionality from a third party.)

Originator's widget 150 encrypts a key request package 120 with the originator's encryption key 140. The widget 150 transmits the key request package 120 to the security provider 175. The security provider 175 validates originator's account and decrypts the key request package 120 with the originator's encryption key 140. The security provider 175 records identifying information about this particular transaction including the recipient identification, and creates a transaction ID 190 to identify this specific communication transaction. Then the security provider 175 generates a single-use key-pair 145 for the originator. The security provider 175 then generates a single-use key-pair 145 for the recipient.

The security provider 175 places the originator's single-use encryption key 145 and the transaction ID 190 into a package and secures it with the originator's encryption key 140 and transmits the key response package 125 back to the originator's widget 150. The originator's widget 150 decrypts the key response package 125 and records the transaction ID 190 and the single-use encryption key 145.

The security provider 175 packages the recipient's single-use decryption key 165 and transaction ID 190 with the recipient's encryption key 160 and transmits the key notification package 115 to the recipient's widget 170. The recipient's widget 170 decrypts the key notification package 115 and records the transaction ID 190 and the recipient's single-use key-pair 165.

Originator's data 100 and the transaction ID 190 are encrypted with the originator's single-use encryption key 145 to create a data package 105. Originator's widget 150 encrypts the data package 105 (e.g., an encrypted QR code 220 as shown in FIG. 9) with the originator's encryption key 140 to create the transmission package 180. Originator's widget 150 sends the encrypted transmission package 180 to the security provider 175.

The security provider 175 validates originator's account and decrypts the transmission package 180 (e.g., decrypting the encrypted QR code 220 as shown in FIG. 9) with the originator's encryption key 140. The security provider 175 then appends the transaction ID 190 and the originator's single-use decryption key 146 to the originator's secured data package 105 with the recipient's single-use encryption key 165 to create a new data package 105.

The security provider 175 encrypts the new data package 105 with the recipient's encryption key 160 to create a new transmission package 180. The security provider 175 sends the encrypted transmission package 180 (e.g., decrypting the encrypted QR code 220 as shown in FIG. 9) to the recipient's widget 170.

The recipient's widget 170 decrypts the transmission package 180 (e.g., decrypting the encrypted QR code 220 as shown in FIG. 9) with the recipient's encryption key 160. Recipient's widget 170 uses the transaction ID 190 to retrieve the stored single-use decryption key 166. Recipient's widget 170 then uses the recipient's single-use decryption key 166 to decrypt the data package 105. Recipient's widget 170 then uses the originator's single-use decryption key 146 to decrypt the original data package 105 (e.g., a decrypted QR code). Recipient processes data 100 as desired by the originator and sends a transaction response back to the security provider 175. Security provider 175 sends transaction response 185 back to the originator 130.

Figure 5:
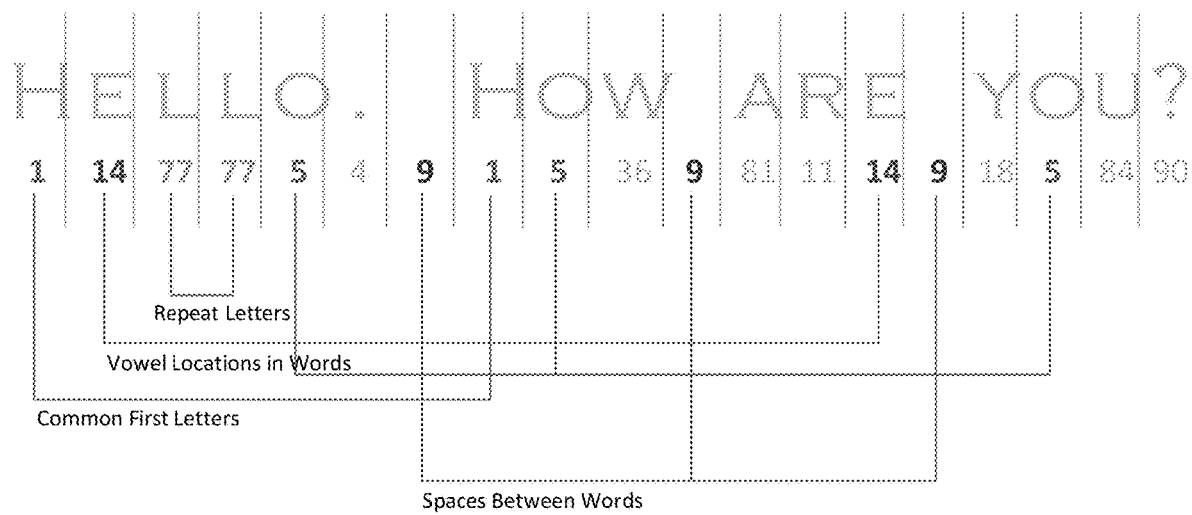
FIG. 5 schematically depicts known decryption methods.

FIG. 5 schematically depicts known decryption methods with known systems. In contrast to FIG. 5, FIGS. 6A and 6B provide schematic depictions of the disclosed encryption methods (and systems implementing these methods). Specifically, FIG. 6A depicts the decryption methods disclosed herein in which randomly-generated character, which are not repeated, correspond to the data desired to be sent to the recipient. FIG. 6B further depicts randomly-generated intermittently dispersed characters that do not correspond to the data to be transmitted are further provided to further mask/conceal the nature and size of the data to transmitted to the recipient peripheral device.

Figure 7:
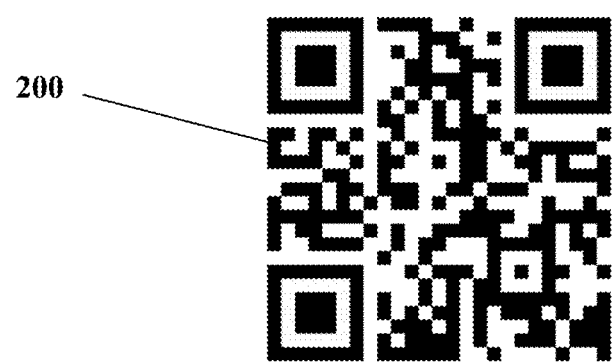
FIG. 7 is a conventional QR code, which opens up the website to, for example, *The Wall Street Journal;*
Figure 8:
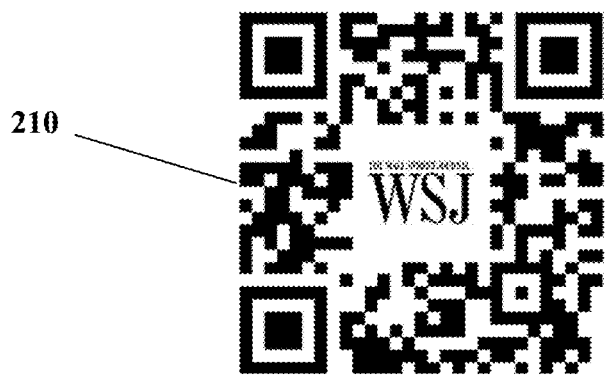
FIG. 8 is a QR code featuring a logo for branding or other identification purposes.

The above mentioned Transactional Cryptography ("TC") methods and systems can be further applied to QR codes to provide an added level of security to transactions and more particularly sensitive transactions that utilize QR codes. Referring specifically to FIGS. 7 and 8, FIG. 7 is a conventional QR code 200, which opens up a predetermined website/URL to, for example, *The Wall Street Journal*, and FIG. 8 is a QR code 210 that opens a website/URL and features indicia (e.g., logo) further identifying the website/URL featuring a logo for branding or other identification purposes. FIG. 9 is a QR code 220 (encrypted QR code) featuring a brand logo, as well as an instructional frame around the code to direct consumers as to specific actions to take.

Referring to FIGS. 7 and 8, a QR code 200, 210 may be included and/or seen on any type of packaging or consumer material. In certain aspects, the QR Codes 200, 210, 220 provide a much larger amount of data to be shared with a user through a camera-enabled device like a smartphone. Referring to FIG. 8, QR Codes 210 can also be fitted with logos, images, or even color schemes as desired by the code's creator to provide further specificity, identification, and/or security. For example, QR Code 200 provides a much larger amount of content to be transmitted to a consumer through a camera-enabled device like a smartphone. QR Codes 210 can also incorporate a logo (e.g., "WSJ" for *The Wall Street Journal*) or other image(s) to provide additional information that is meant to be seen by human eyes. In this case, a brand logo clarifying the company the QR Code 210 will further link to the desired URL/website.

In addition to the above, QR codes 220 (encrypted QR code) can also include a logo showing that the QR Code transaction is secured via Transactional Cryptography ("TC") can be included herein using the systems and methods discussed above and in FIGS. 1-6B to provide the user with additional assurances of the transaction remaining securely communicated to the appropriate company.

Specifically referring to FIG. 9, the QR Code 220 can also be 'framed', which can direct potential users to specific options, uses, or purposes of the Code. It can also direct them to specific types of readers that might be used—smartphones, medical devices, or more.

Figure 10:
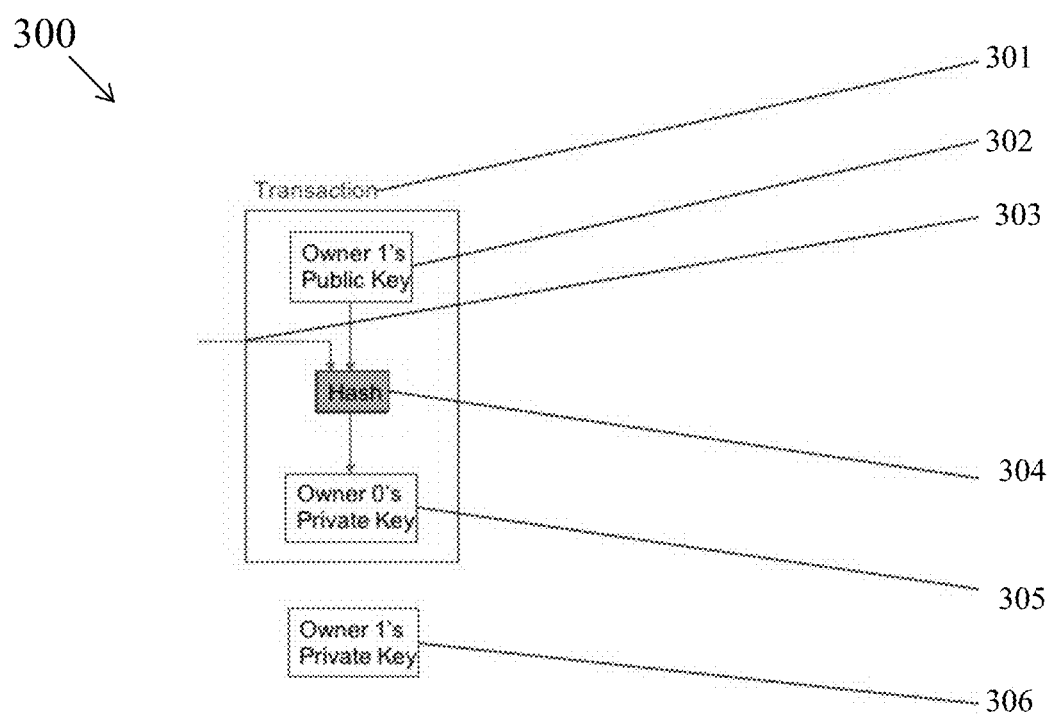
FIG. 10 shows the essential parts of an initial blockchain.

The following reference numerals are used to indicate the parts and environment of the invention on the drawings in FIG. 10:

301 An individual transaction of a blockchain (also referred to as 301' and 301" for subsequent transactions within the chain).

302 The blockchain initiator's public key.

Figure 13:
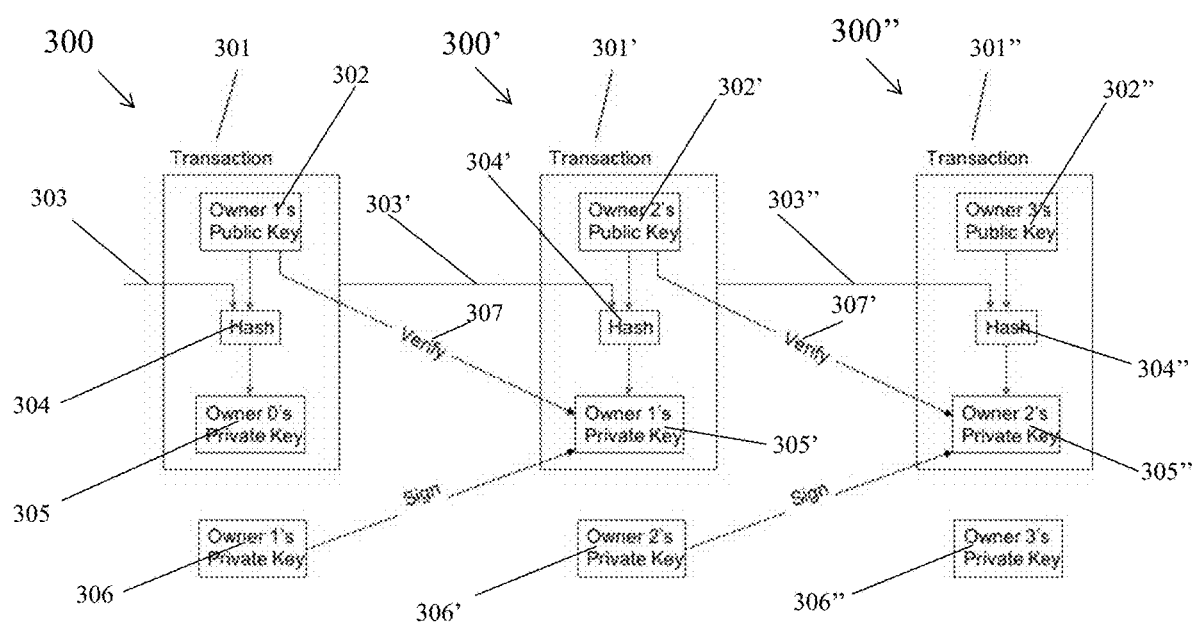
FIG. 13 show the individual blocks of a blockchain are built in a sequential fashion, each built upon the prior block.
Figure 14:
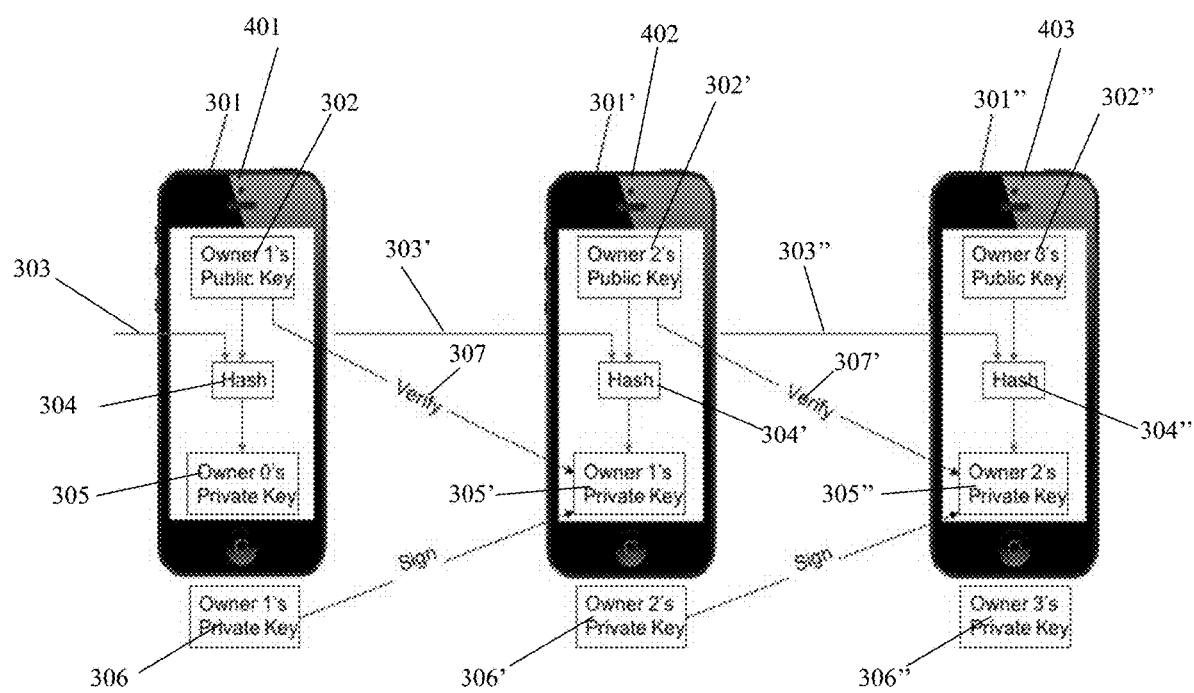
FIG. 14 shows how a smartphone, or other electronic device, provides the impetus for the blockchain string.

303 A prior link in the blockchain. However, if this is the starting point of the blockchain, there is no prior block and 303 is absent within on 303/and 303" being present as shown in FIGS. 13 and 14.

304 The Hash of the blockchain, where mathematical inputs—the content of the blockchain—is mathematically combined with the public key of the initiator.

305, 306 The private key of the blockchain instigator, a cryptographic signature that is not public and not available to any other party, and is communicated to the next block 300' and/or the device 400' to verify 307 (or 307' in FIGS. 4 and 5) the transaction.

306 The originator's private key, which contains the only way to unlock the blockchain to continue building a secure blockchain.

The blockchain systems and methods depicted in FIGS. 10-16 specifically use the Transactional Cryptography ("TC") methods and systems in FIGS. 1-6B and will be further described herein.

Referring to FIG. 10 (and FIG. 13), each transaction 301 (or 301' and/or 301") that takes place is a block (300, 300', 300" respectively). These blocks are linked together via 303' and 303" to compose a digital chain of data, a blockchain.

A (and/or each) block 300 (300' and 300") contains the various components of each digital transaction 301 (and 301' and 301" respectively). The publicly available key of one participant 302 (a first participant) is delivered to the block, along with data referring to the block that came before it 303 (if applicable—if this is the initial block of a chain, then there is no prior block to link thereto and 303 does not exist.) These data points, along with other information for security or storage purposes, are mathematically bound together in a computational hash 304. The hash is also linked to the receiving party's private key 305 in parallel to the instigating party's private key 306.

Figure 11:
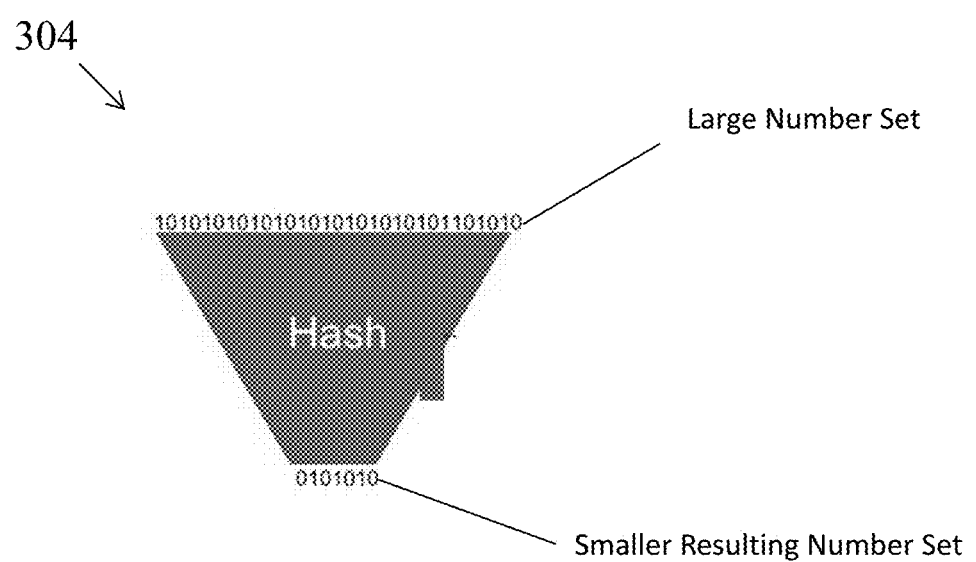
FIG. 11 introduces the concept of the Hash function in a blockchain.

In view of FIG. 10 and further referring to FIG. 11, a hash 304 (or 304' or 304" when referring to FIG. 13) is simply the mathematical reduction of a large number set into a referring smaller number. The numeral itself can contain a wide variety of components, pulling together factors from content, security keys, location data, passwords and PINS (personal identification numbers) and more. The hash 304 makes the resulting number smaller from a computational standpoint.

A large data number calculated from a prior string of numbers is mathematically reduced. This reduction, or hashing does not change or modify the original number's value. It simply changes its form to a smaller referring FIG. 12 that takes less space to store and can be mathematically processed faster than the originating numeral.

Figure 12:
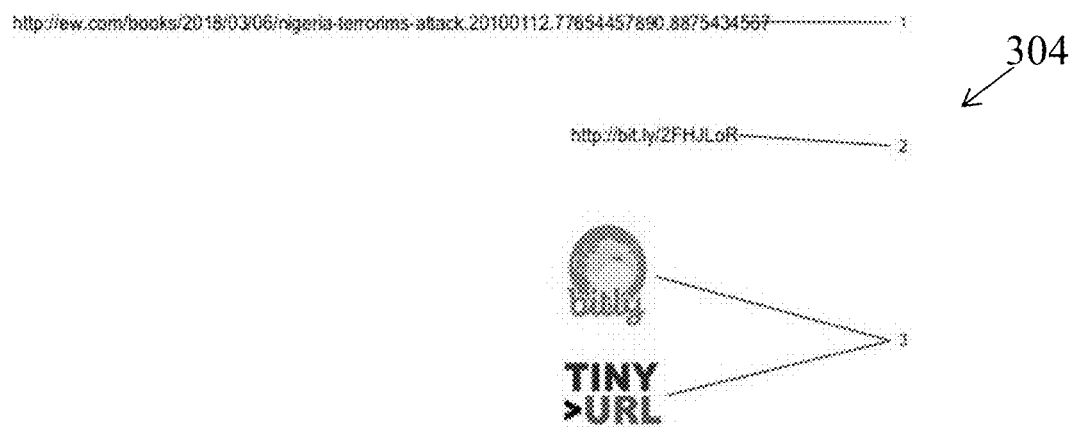
FIG. 12 demonstrates a common Hash function frequently used by consumers (to demonstrate it visually)

Referring to FIG. 12, the hash 304 is a very common process in consumer computing. Anyone who has wanted to save a very long web address string into a shorter, more easily managed web address is familiar with firms that provide this service. A very long website address 1 takes up a lot of space. Printing it on a physical page or storing it in a database takes up unnecessary resources. It would be preferable if a smaller, more easily managed string 2 was permanently assigned to that longer web location 1 where it can be managed more expeditiously. Services such as Bit.ly and TinyURL 3 have provided these types of services for years, linking short URL's to much longer website addresses for consumer, government, and commercial clients worldwide.

Referring to FIG. 13, each subsequent block 300', 300" of hashed data 304', 304" is linked to the block 300 before it, creating this blockchain of data.

A block of data 300, 300', 300" denotes an individual transaction 301, 301', 301". Each subsequent transaction in the chain is linked chronologically to the prior one 303, 303', 303". Meaning that the next block in the chain is digitally linked to the prior block, as well as to the following block in the chain. In FIG. 13, for example, the original bitcoin concept is built on subsequent blockchains of data, which utilized Public Key Infrastructure (PKI) protocols of encryption. However, the instant invention utilizes Applicant's Transactional Cryptography (TC) process as depicted, for example, in FIGS. 1-6B.

Referring to FIG. 14, the blockchain approach disclosed above in FIG. 13 using TC can be accomplished by using smartphones or other mobile electronic devices. The transactions can be done from mobile platforms of different types and using the disclosed Transactional Cryptography (TC) protocols for security.

A consumer initiates a block 300 through their smartphone 401 to reflect a new transaction 301. The next block 300' is digitally linked to the prior block 300, as well as to the following block 300" in the chain. In this FIG. 14, the original bitcoin concept is built on subsequent blockchains of data. Although this original bitcoin concept utilized only Public Key Infrastructure (PKI) protocols of encryption, the disclosed blockchain process(es) uses Transactional Cryptography (TC) as depicted, for example, in FIGS. 1-6B.

Figure 15:
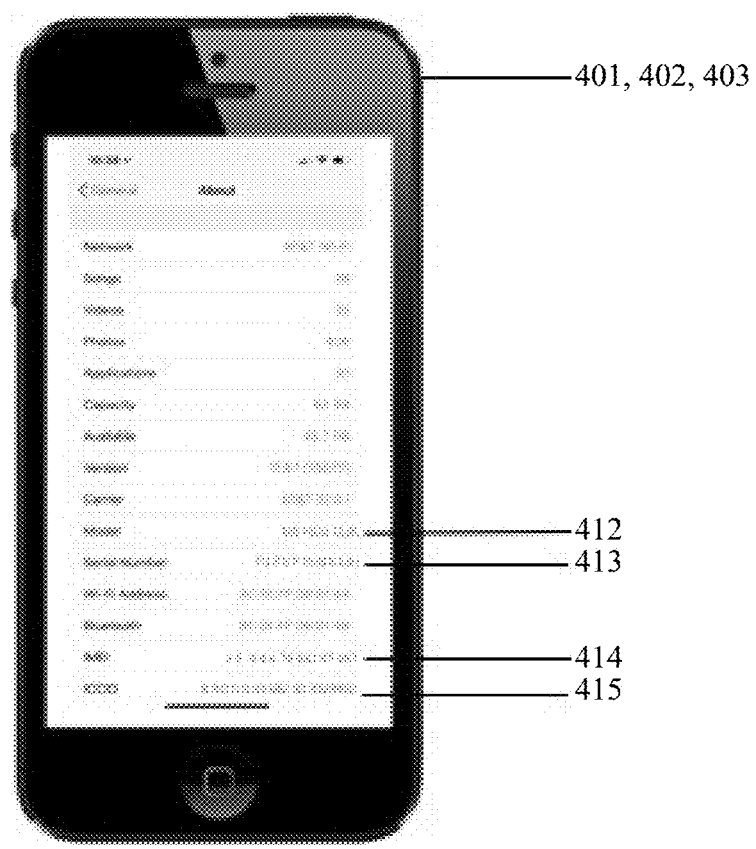
FIG. 15 shows the individual data strings within a smartphone or other electronic device, that become part of the Hash used in a blockchain.

Referring to FIG. 15, smartphones and other devices have a wide variety of referring data sets that can be used to identify individual devices (401, 402, 403). These can be mathematically hashed (304, 304', 304") in various ways depending on the application.

An individual smartphone (or other device) (401, 402, 403), contains a number of different identifiers including (but not limited to) group model numbers 412, individual serial numbers 413, fifteen-digit International Mobile Equipment Identification (IMEI) numbers 414, or a Subscriber Identify Module, (aka, a SIM card), that contains its own unique identifier, called an ICCID number 415. This is by no means an exhaustive list, but is merely an example of the data types that can identify individual devices.

Figure 16:
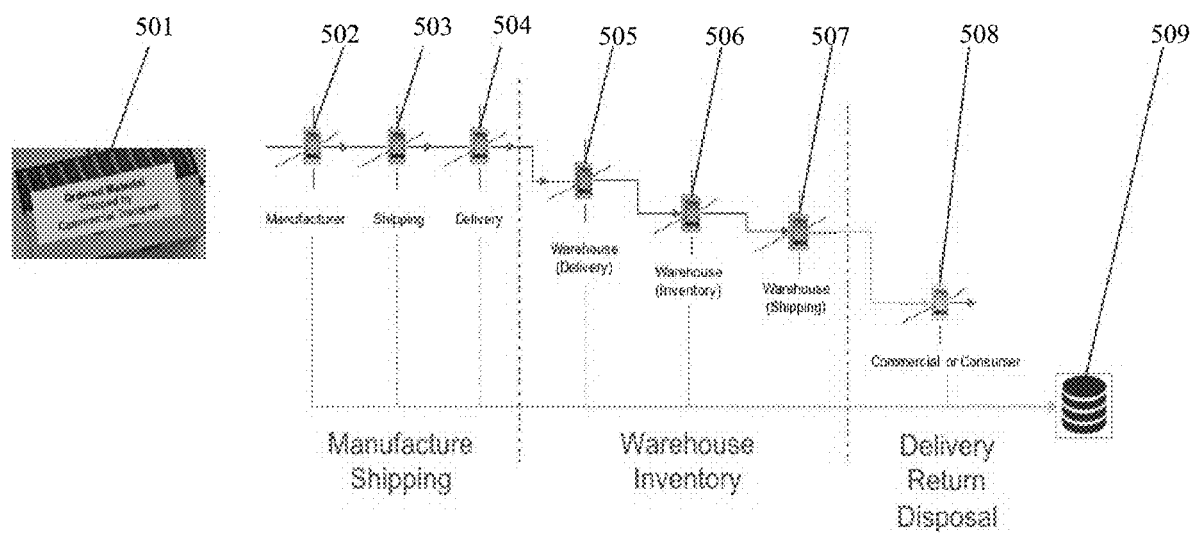
FIG. 16 demonstrates how a series of mobile devices can create a blockchain showing the 'supply-chain-of-custody' of an item from initial manufacture to delivery to the consumer.

Referring to FIG. 16, a blockchain can link individual devices (e.g., 401-403 in FIG. 14), including personal devices used by employees for company business, a popular trend in the current 'Bring Your Own Device' (BYOD) environment of corporate America. Fortunately, the individual's private affairs remain just that—private—and are in no way compromised by the use of blockchain to track transactions their firms may utilize.

For example, a manufacturing company makes a product 501 and a smartphone-based app can capture information about it the moment it is 'born'/produced on the production line 502. Its move to local queuing is tagged 503 as is the moment it is loaded onto a truck for transport off site 504. The receiving warehouse 505 accepts the delivery and it is placed in warehouse inventory 506. When it is transhipped again 507, that transaction is added to the chain. These steps can be repeated as needed, including wholesalers retailers, distributors, trucking/shipping firms, and aftermarket sellers, until an item is ultimately delivered to the end-user customer 508. All of these transactions are catalogued in a single database 509 or in identical databases used by the manufacturer, wholesaler, trucking/delivery firms, distributors, and other partners, until it is delivered to the consumer 509.

| Tags | |
|---|---|
| ID | TAG |
| 100 | Data |
| 105 | Data Package (e.g., QR code 200, 210 to be encrypted) |
| 110 | Environment |
| 115 | Key Notification Package |
| 120 | Key Request Package |
| 125 | Key Response Package |
| 130 | Originator |
| 135 | Originator Device (first peripheral device) |
| 140 | Originator Encryption Key |
| 145 | Originator Single-Use Encryption Key |
| 146 | Originator Single-Use Decryption Key |
| 150 | Originator Widget |
| 155 | Recipient |
| 160 | Recipient Encryption Key |
| 165 | Recipient Single-Use Encryption Key |
| 166 | Recipient Single-Use Decryption Key |
| 170 | Recipient Widget |
| 175 | Security Provider (data encryption server) |
| 180 | Transaction Package (e.g., encrypted QR code 220) |
| 185 | Transmission Response Package |
| 190 | Transaction ID |
| 200 | A QR code that opens a website/URL |
| 210 | A QR code that opens a website/URL and features indicia (e.g., logo) further identifying the website/URL |
| 220 | An encrypted QR code that opens a website/URL and features indicia (e.g., logo) further identifying the website/URL and. that further incorporates a frame around the code to provide instructions on the code's use and purpose. |

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. A method for encrypting data within a blockchain and/or blockchain communication utilizing a data encryption server, comprising the steps of:

registering, with the server, a data originator;

creating, by the server, a data originator encryption key and a corresponding recipient encryption key, the data originator encryption key and the recipient encryption key being a randomly-generated asymmetrical key-pair set configured for one-time use and not otherwise publicly stored, wherein the randomly-generated key-pair set is utilized for a single data transmission between the data originator peripheral device and the recipient peripheral device and discarded after decryption of the transmitted data;

transmitting, by the server, the data originator encryption key to a data originator peripheral device and the recipient encryption key to a recipient peripheral device;

encrypting data within a first block and/or transaction to be transmitted by the data originator peripheral device with the data originator encryption key to a recipient peripheral device, wherein the data to be transmitted is a message and certain ones of characters and/or spaced of the message are assigned a randomly-generated character and further comprising additional randomly-generated intermittently dispersed characters that do not correspond to the data to be transmitted is further provided to further mask the nature and size of the data to transmitted to the recipient peripheral device;

transmitting the encrypted data within the first block and/or transaction to the recipient peripheral device;

verifying that the recipient encryption key and the data originator encryption key are from the same randomly-generated key-pair set; and when the recipient encryption key and the data originator encryption key are verified to be from the same randomly-generated key-pair set, decrypting the encrypted data within the first block and/or transaction received by the recipient peripheral device such that information within the first block and/or transaction is accessible and may be viewed/read.

2. The method according to claim 1, wherein the data to be transmitted is a message and each character and/or space of the message is assigned a randomly-generated character.

3. The method according to claim 2, wherein the randomly-generated character is not repeated.

4. The method according to claim 3, further comprising additional randomly-generated intermittently dispersed characters that do not correspond to the data to be transmitted that further conceal the nature and size of the data to transmitted to the recipient peripheral device.

5. The method according to claim 4, wherein the additional randomly-generated intermittently dispersed characters are not repeated.

6. The method of claim 5, wherein the encrypted data has a unique file extension.

7. The method of claim 6, further comprising:

registering, with the server, a second data originator that is the recipient of the first block and/or transaction from the first data originator;

creating, by the server, the second data originator encryption key and a corresponding second recipient encryption key, the second data originator encryption key and the second recipient encryption key being a randomly-generated asymmetrical key-pair set configured for one-time use and not otherwise publicly stored;

transmitting, by the server, the second data originator encryption key to the second data originator peripheral device and the second recipient encryption key to a second recipient peripheral device;

encrypting data within a second block and/or transaction to be transmitted by the second data originator peripheral device with the second data originator encryption key to the second recipient peripheral device;

transmitting the encrypted data within the second block and/or transaction to the second recipient peripheral device;

verifying that the second recipient encryption key and the second data originator encryption key are from the same randomly-generated key-pair set; and when the second recipient encryption key and the second data originator encryption key are verified to be from the same randomly-generated key-pair set, decrypting the encrypted data within the second block and/or transaction received by the second recipient peripheral device such that information within the first block and/or transaction is accessible and may be viewed/read.

8. The method according to claim 1, wherein the randomly-generated character is not repeated.

9. The method according to claim 1, wherein the additional randomly-generated intermittently dispersed characters are not repeated.

10. The method of claim 9, wherein the encrypted data has a unique file extension.

11. The method of claim 10, further comprising tracking the encrypted data via blockchain technology.

12. A system for encrypting data within a blockchain and/or blockchain communications, comprising:

(a) at least a first and second peripheral device each comprising one or more processors coupled to a memory;

(b) a data encryption server comprising one or more processors coupled to a memory;

(c) and a network router allowing for communication of an encrypted a first block and/or transaction between the first peripheral device, the second peripheral device, and data encryption server; wherein:

the first peripheral device is a data originator and is configured to communicate with and register with the data encryption server;

the data encryption server is configured to concurrently create a data originator encryption key and a corresponding recipient encryption key once the first peripheral device registers with the data encryption server, the data originator encryption key and the recipient encryption key being a randomly-generated asymmetrical key-pair set configured for one-time use and not otherwise publicly stored, wherein the randomly-generated key-pair set is utilized for a single data transmission between the data originator peripheral device and the recipient peripheral device and discarded after decryption of the transmitted data;

the data encryption server is further configured to transmit the data originator encryption key to the first peripheral device and the recipient encryption key to the second peripheral device, which is a recipient peripheral device;

the data encryption server is configured to encrypt data within the first block and/or transaction that is to be transmitted by the data originator peripheral device with the data originator encryption key and transmit the encrypted data within the a first block and/or transaction to the recipient peripheral device, wherein the data to be transmitted is a message and certain ones of characters and/or spaced of the message are assigned a randomly-generated character and further comprising additional randomly-generated intermittently dispersed characters that do not correspond to the data to be transmitted is to further mask the nature and size of the data to transmitted to the recipient peripheral device;

at least one of the first peripheral device, the second peripheral device, and/or data encryption server are configured to verify that the recipient encryption key and the data originator encryption key are from the same randomly-generated key-pair set; and when the recipient encryption key and the data originator encryption key are verified to be from the same randomly-generated key-pair set, decrypting the encrypted data within the a first block and/or transaction received by the recipient peripheral device such that information within the a first block and/or transaction is accessible and may be viewed/read, wherein all the configured functions is executed by their respective processors.

13. The system according to claim 12, wherein the data to be transmitted is a message and each character and/or space of the message is assigned a randomly-generated character.

14. The system according to claim 13, wherein the randomly-generated character is not repeated.

15. The system according to claim 14, further comprising additional randomly-generated intermittently dispersed characters that do not correspond to the data to be transmitted is further provided to further mask the nature and size of the data to be transmitted to the recipient peripheral device.

16. The system according to claim 15, wherein the additional randomly-generated intermittently dispersed characters are not repeated.

17. The system of claim 16, wherein the encrypted data has a unique file extension.

18. The system of claim 17, wherein the unique file extension is at least one of an .epub file, a .zip file, or a .tkp file.

19. The system of claim 12, further comprising:

(c) a third peripheral device comprising one or more processors coupled to a memory, wherein the second peripheral device is a second data originator and is configured to communicate with and register with the data encryption server;

the data encryption server is configured to concurrently create a second data originator encryption key and a corresponding second recipient encryption key once the second peripheral device registers with the data encryption server, the second data originator encryption key and the second recipient encryption key being a randomly-generated asymmetrical key-pair set configured for one-time use and not otherwise publicly stored;

the data encryption server is further configured to transmit the second data originator encryption key to the second peripheral device and the second recipient encryption key to the third peripheral device, which is a second recipient peripheral device;

the data encryption server is configured to encrypt data within a second block and/or transaction that is to be transmitted by the second data originator peripheral device with the second data originator encryption key and transmit the encrypted data within the second block and/or transaction to the second recipient peripheral device;

at least one of the second peripheral device, the third peripheral device, and/or data encryption server are configured to verify that the second recipient encryption key and the data originator encryption key are from the same randomly-generated key-pair set; and if the second recipient encryption key and the second data originator encryption key are verified to be from the same randomly-generated key-pair set, decrypting the encrypted data within the second block and/or transaction received by the second recipient peripheral device such that information within the a second block and/or transaction is accessible and may be viewed/read.

* * * * *